July 27, 1965   G. E. PLATZER, JR   3,197,626
LOGARITHMIC MULTIPLIER-DIVIDER
Filed Jan. 8, 1962   5 Sheets-Sheet 2

INVENTOR.
George E. Platzer, Jr.
BY Harness & Harris
ATTORNEYS.

July 27, 1965  G. E. PLATZER, JR  3,197,626
LOGARITHMIC MULTIPLIER-DIVIDER
Filed Jan. 8, 1962  5 Sheets-Sheet 3

INVENTOR.
George E. Platzer, Jr.
BY Harness & Harris
ATTORNEYS.

July 27, 1965   G. E. PLATZER, JR   3,197,626
LOGARITHMIC MULTIPLIER-DIVIDER
Filed Jan. 8, 1962   5 Sheets-Sheet 5

INVENTOR.
George E. Platzer, Jr.
BY Harness & Harris
ATTORNEYS.

United States Patent Office 3,197,626
Patented July 27, 1965

3,197,626
LOGARITHMIC MULTIPLIER-DIVIDER
George E. Platzer, Jr., Birmingham, Mich., assignor to Chrysler Corporation, Highland Park, Mich., a corporation of Delaware
Filed Jan. 8, 1962, Ser. No. 164,873
17 Claims. (Cl. 235—195)

This invention relates generally to analog computers and more particularly to a circuit for producing an electrical quantity proportional to the product of a pair of electrical quantities applied thereto.

There is a need for a simple yet reliable analog computer circuit for a variety of industrial control applications such as turbine engine fuel control, welding input power control, and in direct analog computer applications in which an output signal is required which is proportional to the product of two or more D.C. input signals.

Accordingly, it is an object of this invention to provide an analog multiplying circuit which is simple with respect both to the components required and the operational requirements of the circuit.

It is an additional object of this invention to provide a multiplying circuit with stabilizing components to prevent variations due to temperature changes.

It is an additional object of this invention to provide an analog multiplying circuit which is capable of four quadrant operation, that is, having an output of the proper polarity for the particular polarity of the inputs both of which may be reversible with respect to the other.

It is a further object of this invention to provide a D.C. voltage operating multiplier which requires no A.C. signal for its operation.

It is a further object of this invention to provide an analog multiplying circuit which is readily converted into a divider circuit by the simple expedient of interchanging variable signal current and constant current.

It is a still further object of this invention to provide a multiplying circuit which is accurate in the order of less than one percent of full output.

The foregoing statements are merely illustrative of the various aims and objects of the present invention. Additional objects and advantages will become apparent from the following specification when considered in conjunction with the accompanying drawings, in which

FIGURE 6 is a schematic of a four quadrant multiplying circuit in which transistors are employed as the input elements;

The invention, as herein illustrated among the several embodiments in the drawings, utilizes diodes and transistors with substantially the same exponential characteristics which operate entirely in the logarithmic domain. It will be appreciated by those skilled in the art that the invention is not necessarily limited to solid state devices but may be practiced with other types of switching devices such as, for example, with variable-mu tubes which produce a plate current proportional to the logarithm of the grid input voltage within a limited range of the input voltages. Similarly, by operating a variable-mu tube with the input voltage applied to the plate and current withdrawn at the grid, the output current is proportional to the antilogarithm of the voltage input to the plate.

Figure 1:
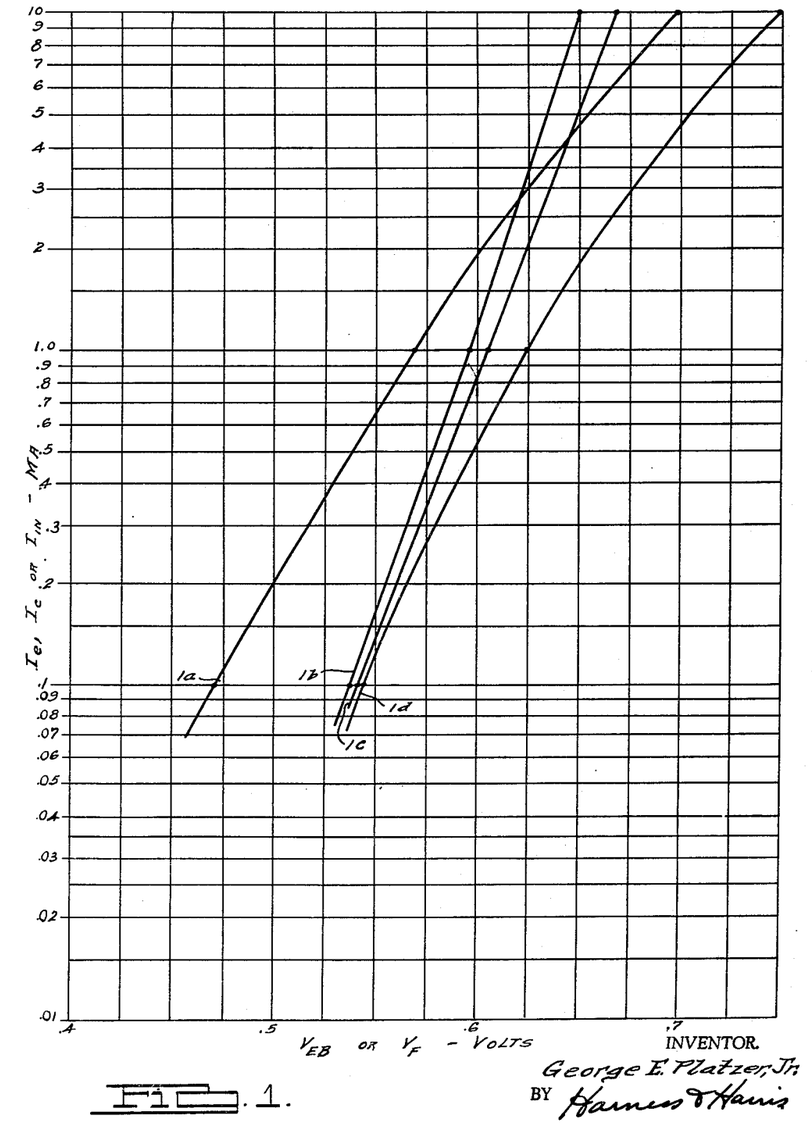
FIGURE 1 is a graph plotted on semi-logarithmic coordinates showing the diode and transistor current-voltage characteristics.
Figure 1A:
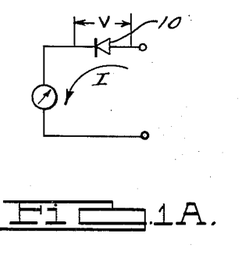
FIGURE 1A is a schematic of a diode from which is derived its forward current-voltage characteristics as shown in line 1a of the graph of FIGURE 1.

The principle of operation of the circuits of the present invention is best explained with reference to the graph of FIGURE 1 which shows the current-voltage characteristics of a silicon FD200 diode and a 2N1711 junction transistor. Under optimum conditions and to give perfect accuracy the lines 1a and 1b should be straight and parallel in slope. It is well known that semi-conductor junction diodes have the current-voltage characteristic as exhibited by diode 10 in FIGURE 1A and shown by line 1a in FIGURE 1 and as theoretically described by the following equation:

$$I = I_S\left(e^{\frac{qV}{kT}} - 1\right) \cong I_S e^{\frac{qV}{kT}} \qquad \text{Equation 1}$$

wherein $I_S$ = diode saturation current (amperes),
$q$ = electron charge (coulombs),
$V$ = diode voltage (volts),
$k$ = Boltzmann's constant, and
$T$ = Temperature.

The above approximation is quite good when V is greater than about 0.1 volt.

The saturation or reverse current of the diode is itself temperature dependent and is of the form $$I_S = I_{S0} e^{\left(\frac{E_G}{kT_0^2} + \frac{5}{2T_0}\right)T - T_0} \qquad \text{Equation 2}$$

wherein $I_{S0}$ = saturation current at $T_0$
$E_G$ = energy gap of the material.

The exponential form of the approximation in Equation 1 indicates its use in the multiplication process. Taking the natural logarithm of both sides of Equation 1 shows that $$V = \frac{kT}{q} \ln \frac{I}{I_S} \qquad \text{Equation 3}$$

Figure 2:
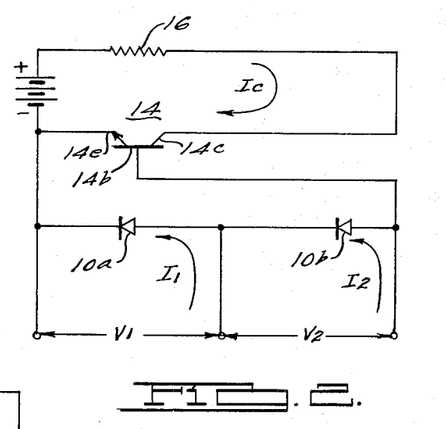
FIGURE 2 is a schematic of the basic multiplying circuit employing two input diodes and one transistor.

Therefore, it may be seen that the voltage across a diode is proportional to the logarithm of the current through it. If two semiconductor diodes are connected in series in the manner shown hereinafter in FIGURE 2, the sum of the voltages is proportional to the logarithm of the product of the two current inputs and we have the basic elements of a multiplying circuit in which $$V_1 + V_2 = \frac{kT}{q} \ln \frac{I_1}{I_{S1}} + \frac{kT}{q} \ln \frac{I_2}{I_{S2}}$$

or $$V_1 + V_2 = \frac{kT}{q} \ln \frac{I_1 I_2}{I_{S1} I_{S2}} \qquad \text{Equation 4}$$

wherein the subscripts relate to the first or second diodes connected in series.

It will then be apparent that the product of $I_1 \times I_2$ can be determined by simply taking the antilogarithm of $V_1 + V_2$ in Equation 4 so that $$I_1 I_2 = I_{S1} I_{S2} e^{\frac{q}{kT}(V_1+V_2)} \qquad \text{Equation 5}$$

The limitations for the antilogarithm device are that it must have the same exponential characteristic as the diodes and it must not appreciably disturb the signal currents flowing in the diodes. A junction transistor fills this requirement since its emitter-base diode has the same type of exponential characteristic as any other junction diode. Furthermore, the base current can be made a small fraction of the current flowing into the two input diodes.

FIGURE 2 shows a simple multiplying circuit utilizing a pair of input diodes 10a, 10b, and a transistor 14 having a base, 14b, a collector, 14c, and an emitter, 14e. The emitter-base diode of transistor 14 has a voltage-current characteristic like Equation 1 and may be expressed as follows:

$$I_E = I_{SE} e^{\frac{qV_{EB}}{kT}} \qquad \text{Equation 6}$$

Since $V_{EB} = V_1 + V_2$ according to the configuration of the circuit of FIGURE 2 it follows from Equations 6 and 5 that, $$I_E = \frac{I_{E0}}{I_{S1} I_{S2}} I_1 I_2 \qquad \text{Equation 7}$$

Equation 7 shows that the emitter current of the transistor 14 is proportional to the input diode current products. If the collector cut-off current is low and the current gain $h_{fb}$ is nearly unity, this is also true of the collector current since $$I_C = h_{fb} I_E + I_{C0} \qquad \text{Equation 9}$$

wherein $h_{fb}$ = common base forward current gain
$I_{C0}$ = collector saturation current.

Thus the actual output current may be taken from the collector 14c or an output voltage may be taken from the collector load resistor 16. The circuit of FIGURE 2 is operative to perform the multiplication process but its accuracy is not high enough for many applications and the circuit is also subject to temperature drift.

Figure 3:
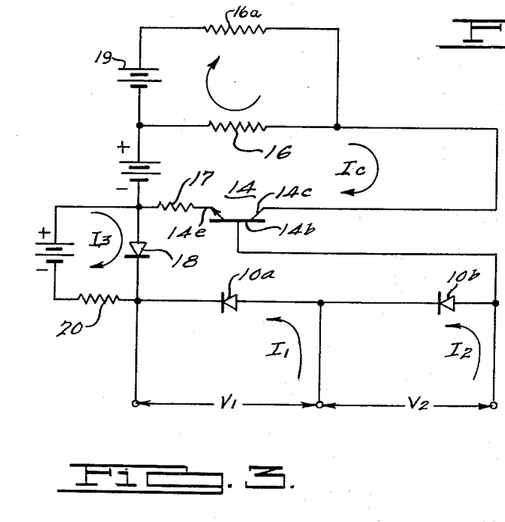
FIGURE 3 is a schematic of the multiplying circuit of FIGURE 2 modified to prevent temperature drift inaccuracies, equalize current densities, and to provide compensation for collector saturation current in the output circuit.

FIGURE 3 shows the circuit of FIGURE 2 modified to eliminate the two principal sources of error present therein. Temperature drift could be anticipated because the saturation currents $I_{SE}$, $I_{S1}$, and $I_{S2}$ in Equation 7 are all of the form shown in Equation 2. With one more temperature dependent quantity in the denominator than in the numerator, drift may be expected. Otherwise stated, the proportionality between $I_E$ and the product $I_1 \times I_2$ changes with temperature. The accuracy of the circuit of FIGURE 2 is also adversely affected by the fact that Equation 1 is true only over a limited range. At high current values, the internal series resistance is a factor and the exponent is double that shown in Equation 1, that is, $$I = I_S e^{\frac{2qV}{kT}} \qquad \text{Equation 8}$$

These sources of error are largely eliminated by the inclusion in the circuit of a third diode 18 with its D.C. current supply and limiting resistor 20. Diode 18 and its associated current supply are utilized to buck out part of the voltage supplied by the input diodes 10a and 10b. Equation 6 for the emitter base diode of the transistor now becomes $$I_E = I_{E0} e^{\frac{q}{kT}(V_1+V_2-V_3)} = I_{E0} e^{\frac{-qV_3}{kT}} e^{\frac{q}{kT}(V_1+V_2)}$$

$$= \frac{I_{E0}}{I_{S1} I_{S2}} e^{\frac{-qV_3}{kT}} I_1 I_2$$

Since $$I_3 = I_{S3} e^{\frac{qV_3}{kT}}$$

and $$e^{\frac{-qV_3}{kT}} = \frac{I_{S3}}{I_3}$$

by substitution we derive the equation $$I_E = \frac{I_{E0} I_{S3}}{I_{S1} I_{S2} I_3} I_1 I_2 \qquad \text{Equation 10}$$

Figure 1B:
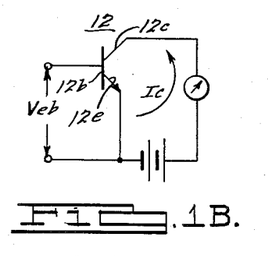
FIGURE 1B is a schematic of a basic transistor circuit from which is derived its collector current versus emitter-base voltage characteristic as shown in line 1b of the graph of FIGURE 1.

Equation 10 shows that variations of the saturation currents with temperature are now balanced and essentially cancelled out with two each in the numerator and denominator. FIGURE 3 also shows a resistor 17 in the emitter circuit and a current source 19 with current limiting resistor 16a supplying a current through resistor 16 flowing in a direction opposite to the collector current. The function of emitter resistor 17 is to modify the shape of curve 1b of the transistor characteristic in FIGURE 1 to make it more nearly match that of the diode 1a. Lines 1a and 1b are representative of the current-voltage characteristics of a diode and a transistor connected according to the schematics of FIGURES 1A and 1B, respectively. The purpose of the current source is to supply a current through the load resistor which is equal in magnitude but of opposite direction to the collector cut-off current. Resistor 16 in the current source circuit must be temperature sensitive and have characteristics such that its current is always equal to the temperature sensitive collector cut-off current. It will be seen that by the circuit of FIGURE 3, I have provided a multiplying circuit which is workable within practical operation limits to accomplish the multiplication process. An accuracy within the limits of approximately 2% is possible with this circuit even in the absence of a perfect match of the transistor 14 to the diodes 10a and 10b as is illustrated by the current conducting characteristics shown in FIGURE 1.

The compensating diode 18 could be replaced by a resistor and temperature sensitive means to maintain the voltage across the resistor in such a manner as to simulate diode 18. In an isothermal environment the temperature sensitive means could even be eliminated.

Figure 1C:
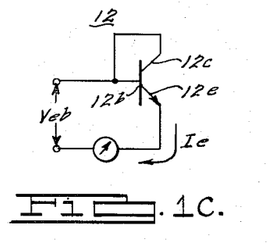
FIGURE 1C is a schematic of a transistor having base and collector connected together from which is derived its emitter current versus emitter-base voltage characteristic as shown in line 1c of the graph of FIGURE 1.
Figure 1D:
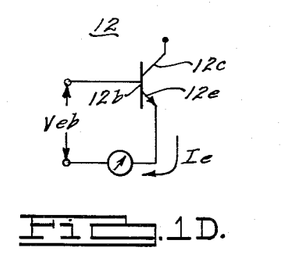
FIGURE 1D is a schematic of a second transistor circuit with its collector circuit open from which is derived its emitter current versus emitter-base voltage characteristic as shown in line 1d of the graph of FIGURE 1.
Figure 4:
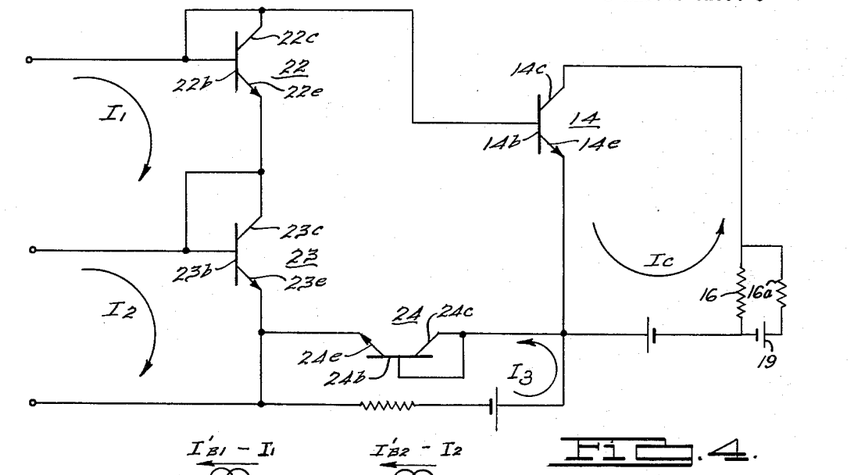
FIGURE 4 is a schematic of a modification of the basic multiplying circuit of FIGURE 2 with transistors utilized as input or logarithmic deriving elements in place of diodes.

FIGURE 4 shows a circuit employing transistors 22 and 23 as the input or logarithmic determining elements of the circuit. Transistor 24 is included in the circuit to minimize the effect of temperature drift and high currents in the same manner in which diode 18 functions in the circuit of FIGURE 3. The collectors 22c and 23c of each of the aforementioned transistors are connected back to their bases 22b and 23b, respectively. The result of the coupling arrangement is to much improve the match between the current-voltage characteristics of the input elements 22 and 23 and those of the output or antilogarithmic determining transistor 14 as indicated by the lines 1b and 1c of FIGURE 1. FIGURE 1D shows a schematic of a transistor connected with the collector open. The current-voltage characteristic of its emitter-base diode as plotted on line 1d in FIGURE 1 shows a similarity to that of the conventional diode of FIGURE 1A. The outstanding improvement in logarithmic characteristic shown in line 1c of FIGURE 1 is achieved by connecting the collector to the base after the manner of FIGURE 1C. The circuit of FIGURE 4 yielded much improved accuracies of the order of .25%. Resistor 16 is connected in the collector circuit of output transistor 14. Connected across resistor 16 are current source 19 and resistor 16a for providing a current flow therethrough equal in magnitude but of opposite direction to the collector cut-off current.

Figure 5:
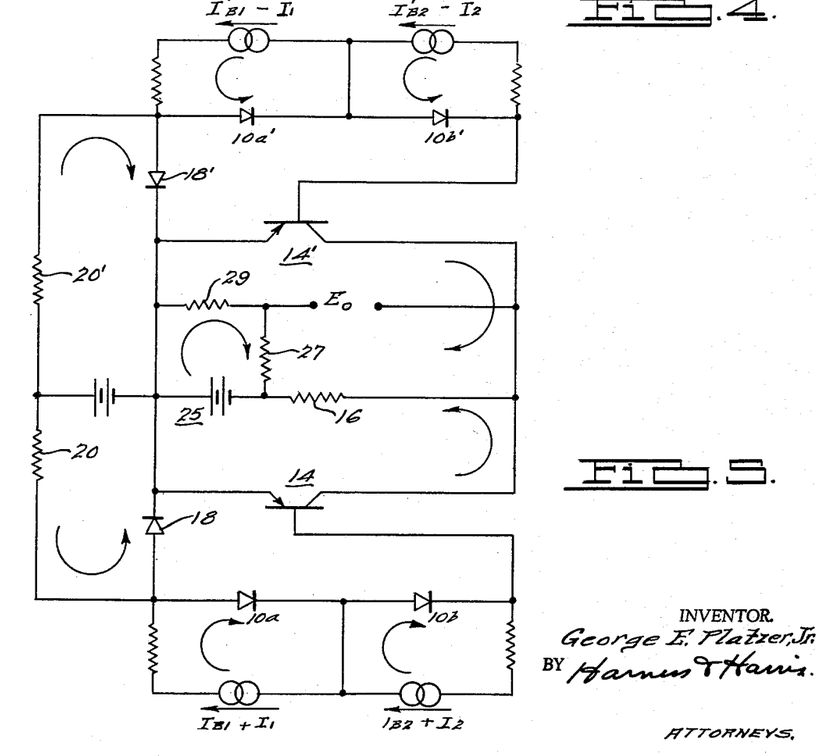
FIGURE 5 is a schematic of a four quadrant multiplying circuit in which diodes are employed as the input elements.

FIGURE 5 shows a four quadrant multiplying circuit which is formed by essentially combining two multiplying circuits of the type shown and described in connection with FIGURE 3, hereinbefore, and operating with an initial bias on each of the multiplying circuits. A four quadrant multiplier is desirable in some applications since it is capable of accepting positive and negative factors and of producing positive and negative products therefrom. An initial bias $I_{B1}$ and $I_{B2}$ is applied over each of the input terminals to input diodes 10a, 10b, 10a', and 10b'. The same signal voltages or currents $I_1$ and $I_2$ is sent to the input diodes of each multiplier but the polarities of the signals are reversed in the manner illustrated by FIGURE 5. Load resistor 16 is common to both transistors 14 and 14'. In operation, one multiplier produces a current in load resistor 22 of $$(I_{B1}+I_1)(I_{B2}+I_2)=I_{B1}I_{B2}+I_2I_{B1}+I_1I_2+I_1I_{B2}$$
Equation 11 wherein
$I_{B1}$=bias current in diode 10a,
$I_{B2}$=bias current in diode 10b,
$I_1$=signal current in diode 10a, and
$I_2$=signal current in diode 10b.
The other multiplier produces a current of $$(I'_{B1}-I_1')(I'_{B2}-I_2')=I'_{B1}I'_{B2}-I'_1I'_{B2}-I'_2I'_{B1}+I'_1I'_2$$
Equation 12

Since load resistor 16 is common to both transistors 14 and 14', Equations 11 and 12 may be added and the load current may be expressed as $$I_L = 2I_{B1}I_{B2}+2I_1I_2 \quad \text{Equation 13}$$

The above relationship holds true so long as all bias currents $I_{B1}$, $I_{B2}$, $I'_{B1}$, and $I'_{B2}$ are equal. The product of the D.C. bias $I_{B1}I_{B2}$ is a constant which may be subtracted from the output.

This may be accomplished by means of resistors 27 and 29 with voltage supply 25 to form a voltage cancelling network and with the output voltage taken across Eo. Alternately, a current cancelling network could be formed with a resistor and another voltage supply to supply a current through resistor 16 which is equal in magnitude to $2I_{B1}I_{B2}$ but of opposite direction. In the latter case the output would appear across resistor 16. In both cases the output voltage would be representative of the product of the input current to the multiplier regardless of their polarity. While the four quadrant multiplying circuit of FIGURE 5 is combined from two multiplying circuits substantially similar to the one shown in FIGURE 3, it will be appreciated that two multiplying circuits as shown in FIGURE 4 may similarly be incorporated in a four quadrant multiplier.

The ability to perform division is another function of the basic circuit as shown in FIGURE 3. If $I_3$ is a variable signal current and $I_2$ is made a constant current, it will be seen that $I_E$ or $I_C$ of the transistor 14 is proportional to $I_1/I_3$. This is best illustrated by the rearrangement of terms in Equation 10 as follows:

$$I_E = \frac{I_{E0}I_{S2}I_{S2}}{I_{S3}I_{R1}} \times \frac{I_1}{I_3}$$

It will thus be seen that I have provided an analog multiplying circuit which is readily converted into a divider circuit by the interchange of variable signal current and constant current. By making $I_1$, $I_2$, and $I_3$ all variable currents, the circuits of FIGURES 3 and 4 will perform the combined function of multiplication and division.

FIGURE 6 shows a four quadrant multiplying circuit like that of FIGURE 5 which comprises two transistor type multiplying circuits combined. The input elements of FIGURE 6 are transistors 22, 22', 23 and 23' which are connected with compensating transistor 25 as shown. The initial biases $I_{B1}$, $I_{B2}$ and $I'_{B1}$, $I'_{B2}$ are applied after the manner of FIGURE 5 to provide a mode of operation like that previously set forth in connection with that figure.

Figure 7:
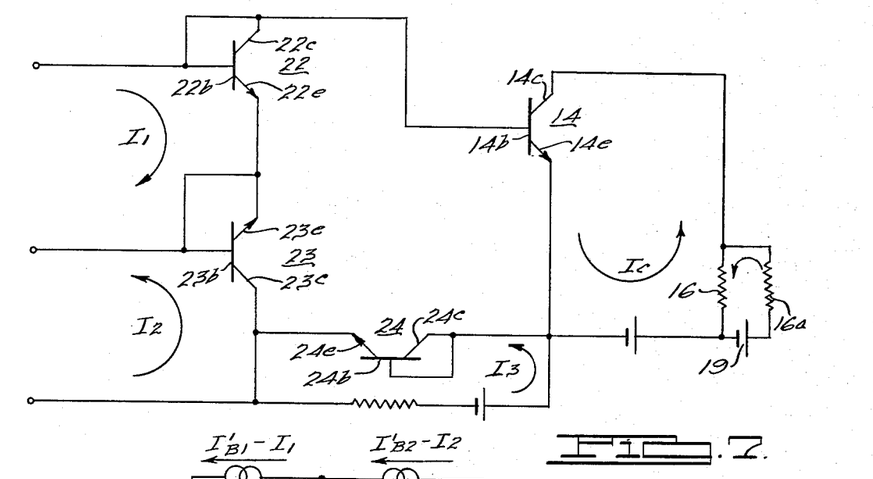
FIGURE 7 is a schematic of a circuit for performing division.

FIGURE 7 shows a circuit for performing division. It will be seen that input transistors 22 and 23 are connected in series subtractive relationship with input currents $I_1$ and $I_2$, as shown. Transistor 24 is included as a compensating element in the circuit to minimize the effect of temperature drift and high currents. Otherwise stated, the circuit of FIGURE 7 is operable to perform the function of ratio taking between the quantity represented by current input $I_2$ and that represented by current input $I_1$. Transistor 23 functions as a multiplying transistor while transistor 22 functions as a dividing transistor with compensating transistor 24 connected in like polarity to transistor 23.

Figure 8:
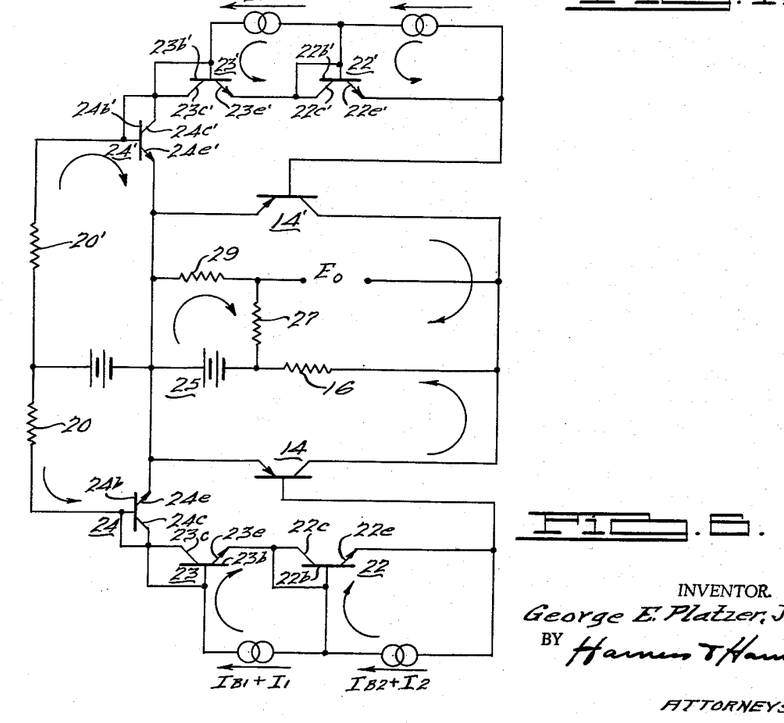
FIGURE 8 is a schematic of a circuit for performing the combined functions of multiplication and division.

FIGURE 8 shows a circuit for providing the combined functions of multiplication and division. Accordingly, diodes 10a and 10b function as multiplying diodes with polarity and inputs $I_1$, $I_2$ as shown. Diodes 10c and 10d function as dividing diodes with current inputs $I_4$, $I_5$ as shown and with opposite polarity to multiplying diodes 10a, 10b. Compensating diodes such as diode 18 are provided as required. As input voltages $V_1-V_4$ are varied, the quantities to be multiplied or divided may be selectively changed as the computation may require.

Figure 9:
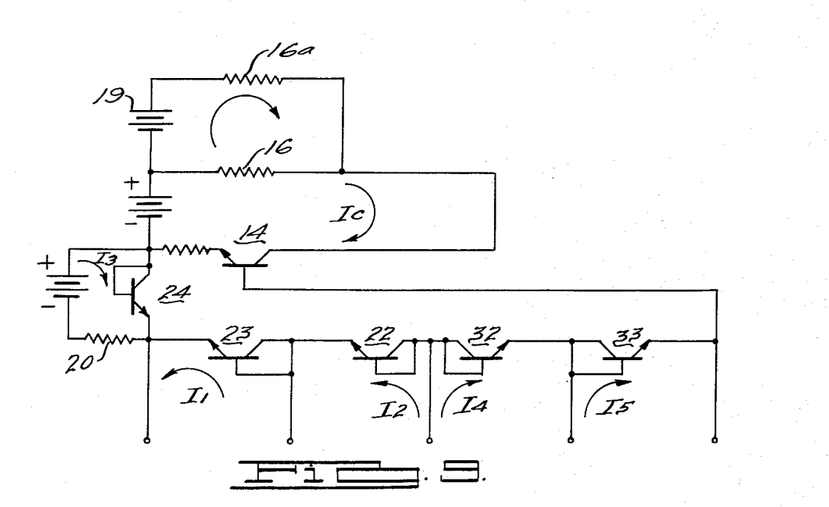
FIGURE 9 is a schematic of a circuit essentially similar to that of FIGURE 8 except that transistors are used in place of diodes as the input elements.

FIGURE 9 shows an alternate and preferred embodiment of the combined multiplying and dividing circuit of FIGURE 8 in which transistors 22 and 23 are utilized as multiplying input elements in place of diodes 10a and 10b. Transistors 32, 33 function as dividing input elements after the manner of diodes 10c, 10d. Transistor 24 replaces diode 18 of FIGURE 8 as the compensating element. It will be seen that the connection of transistors 22, 23 is subtractive relative to transistors 32, 33 so that the quantities represented by current inputs $I_1$, $I_2$ will be divided by the quantities represented by current inputs $I_4$, $I_5$.

The foregoing disclosure and showings made in the drawings are merely illustrative of the principles of this invention. It will be appreciated by those skilled in the art that this invention may be subject to modifications in its details through substitution of other types of electronic or electrical devices for the transistors indicated, and that this invention may be further modified in the organization of its details, all without departure from the spirit and scope of this invention.

I claim:

1. A circuit for multiplying a pair of quantities represented by current inputs comprising a first and second input transistor, each having an emitter, base, and collector and having its base and collector connected, said input transistors operable to produce a voltage proportional to the logarithm of the input current, said transistors connected to each other in a series additive relationship and each having a pair of input terminals connected between its base and emitter, an electrical means connected in series with said first and second input transistors for producing a voltage to reduce the sum voltage of said first and second transistors and having substantially the same temperature voltage operating characteristics as said first and second input transistors, an output transistor having an emitter, collector, and base, said first and second input transistors and said electrical means connected across said base and emitter of said output transistor, said output transistor operable to produce through its collector a current output proportional to the antilogarithm of the sum of the voltages applied between its emitter and base.

2. A circuit for multiplying a pair of quantities represented by current inputs comprising a first and second input transistor, each having an emitter, base, and collector and having its base and collector connected, said input transistors operable to produce a voltage proportional to the logarithm of the input current, said transistor connected to each other in a series additive relationship and each having a pair of input terminals connected between its base and emitter, a third transistor having an emitter, base, and collector, and having its base and collector connected, said third transistor connected in series with said first and second transistors and biased forwardly with a constant current but of voltage polarity opposite to said first and second transistors, a fourth transistor having its base and emitter connected across said first, second, and third transistors, said transistors all having substantially the same temperature and voltage-current characteristics, said fourth transistor operable to produce through its collector an output current proportional to the antilogarithm of the sum of the voltages applied between its base and emitter.

3. A circuit for dividing a quantity by another quantity, each of the aforesaid quantities represented by current inputs comprising a first and a second input transistor, each having an emitter, base, and collector and having its base and collector connected, said input transistors each operable to produce a voltage output proportional to the logarithm of its input currents, said input transistors connected to each other in a series subtractive relationship and each having a pair of input terminals connected between its base and emitter, a compensating transistor having its base connected to its collector and its emitter operatively connected to the combined outputs of said first and second transistors, and an output transistor having its base and emitter operatively connected across all the aforesaid transistors, said output transistor operable to produce through its collector a current proportional to the antilogarithm of the voltages applied between its base and emitter.

4. A circuit for dividing a quantity by another quantity, each of the aforesaid quantities represented by current inputs comprising a first and a second input transistor, each having an emitter, base and collector and having its base and collector connected, said input transistors each operable to produce a voltage output proportional to the logarithm of its input current, said input transistors having their respective emitters connected in a series subtractive relationship and each having a pair of input terminals connected between its base and emitter, a compensating transistor having its base connected to its collector and its emitter and collector connected in series with the respective emitters and collectors of said input transistors, means for providing a constant biasing current to said compensating transistor, and an output transistor having its base and emitter operatively connected across all the aforesaid transistors, said output transistor operable to produce through its collector a current proportional to the antilogarithm of the voltages applied between its base and emitter.

5. A circuit for dividing a quantity by another quantity, each of the aforesaid quantities represented by current inputs comprising a first and a second input transistor, each having an emitter, base, and collector and having its base and collector connected, said input transistors each operable to produce a voltage output proportional to the logarithm of its input currents, said input transistors connected to each other in a series subtractive relationship and each having a pair of input terminals connected between its base and emitter, a compensating transistor having its base connected to its collector and its emitter operatively connected to the combined outputs of said first and second transistors, an output transistor having its base and emitter operatively connected across all the aforesaid transistors, said output transistor operable to produce through its collector a current proportional to the antilogarithm of the voltages applied between its base and emitter, a load resistor connected in the collector circuit of said output transistor, and a D.C. source connected across said resistor to provide a current flow therethrough equal in magnitude but of opposite direction to the collector cut-off current.

6. A circuit for multiplying a pair of quantities represented by current inputs comprising a first and second input transistor each having an emitter, base, and collector and having its base and collector connected, said input transistors operable to produce a voltage output proportional to the logarithm of the input current, said transistors connected to each other in a series additive relationship and each having a pair of input terminals connected between its base and emitter, a third transistor having an emitter, base, and collector and having its base and collector connected, said third transistor operatively connected to the combined outputs of said first and second transistors and biased forwardly with a constant current but of voltage polarity opposite to that of said first and second transistors, and a fourth transistor having its base and emitter operatively connected across said first, second, and third transistors, said transistors all having substantially the same temperature and voltage-current characteristics, said fourth transistor operable to produce through its collector an output current proportional to the antilogarithm of the sum of the voltages applied between its base and emitter, a load resistor connected in the collector circuit of said fourth transistor, and a D.C. source connected across said resistor to provide a current flow therethrough equal in magnitude but of opposite direction to the collector cut-off current.

7. A four quadrant multiplier comprising a first and a second pair of input transistors, each of said transistors having an emitter, base and collector and having its base and collector connected, said transistors in each of the aforesaid pairs connected to each other in a series additive relationship and having a pair of input terminals connected across its base and emitter, each of said pairs adapted to receive a current input of opposite polarity, said input transistors operable to provide voltage outputs proportional to the logarithm of their input currents, a first and a second compensating transistor, each having an emitter, base and collector and having its base and collector connected, said first compensating transistor connected in series with said first pair of input transistors and biased forwardly with a constant current but of voltage polarity opposite to said first pair of input transistors, said second compensating transistor connected in series with said second pair of input transistors and biased forwardly with a constant current but of voltage polarity opposite to said second pair of input transistors, a first and a second output transistor, said first output transistor having its base and emitter connected across said first pair of input transistors and said serially connected first compensating transistor, said second output transistor having its base and emitter connected across said second pair of input transistors and said serially connected second compensating transistor, said output transistors each operable to provide through its collector an output current proportional to the antilogarithm of the sum of the voltages applied between its base and emitter, means for applying a fixed D.C. bias of the same magnitude across the input terminals of each of said first pair of input transistors, means for applying a fixed D.C. bias of the same magnitude and direction as the aforesaid fixed D.C. bias across the input terminals of each of said second pair of input transistors, and a common load resistor operatively connected across said output transistors.

8. The combination as set forth in claim 7 wherein a D.C. bias source and a resistor are operatively connected across said common load resistor to provide a current flow therethrough equal in magnitude to twice the product of said fixed D.C. bias but of opposite direction.

9. A four quadrant multiplier comprising a first and a second pair of input diodes, said diodes in each of the aforesaid pairs connected to each other in a series additive relationship, each of said diodes having a pair of input terminals connected across its anode and cathode, said input diodes operable to provide voltage outputs proportional to the logarithm of their input currents, a first and a second compensating diode, said first compensating diode connected in series with said first pair of input diodes and biased forwardly with a constant current but of voltage polarity opposite to said first pair of input diodes, said second compensating diode connected in series with said second pair of input diodes and biased forwardly with a constant current but of voltage polarity opposite to that of said second pair of input diodes, a first and a second output transistor, said first output transistor having its base and emitter connected across said first pair of input diodes and said serially connected first compensating diode, said second output transistor having its base and emitter connected across said second pair of input diodes and said serially connected second compensating diode, said output transistors each operable to provide through its collector an output current proportional to the antilogarithm of the sum of the voltages applied between its base and emitter, means for applying a fixed D.C. bias of the same magnitude across the input terminals of each of said first and second pair of input diodes, and a common load resistor operatively connected across said output transistors.

10. The combination as set forth in claim 9 wherein a D.C. bias source and a resistor are operatively connected across said common load resistor to provide a current flow therethrough equal in magnitude to twice the product of said fixed D.C. bias but of opposite direction.

11. A circuit for combined multiplication and division of quantities represented by current inputs comprising a plurality of multiplying input diodes and a plurality of dividing input diodes, said diodes connected in series, each of said input diodes having a pair of input terminals connected across its anode and cathode, said multiplying diodes having one polarity and said dividing diodes having an opposite polarity, a compensating diode having a biasing source connected thereto and connected in series with said multiplying and dividing diodes, an output transistor having its base and emitter connected across the serial combination of said multiplying, dividing, and compensating diodes, said output transistor operable to produce through its collector circuit a current proportional to the antilogarithm of the sum of the voltages applied between its base and emitter, a load resistor connected in the collector circuit of said output transistor, and a D.C. source connected across said resistor to provide a current flow therethrough equal in magnitude but of opposite direction to the collector cut-off current.

12. The combination as set forth in claim 11 in which a resistor is connected in the emitter circuit of said output transistor for matching its voltage-current characteristic to that of said input diodes.

13. A circuit for combined multiplication and division of quantities represented by current inputs comprising a plurality of multiplying and dividing input transistors, each having an emitter, base, and collector and having its collector connected to its base, said input transistors connected in series and each having a pair of input terminals connected across its base and emitter, said multiplying input transistors having one polarity and said dividing input transistors having the opposite polarity, a compensating transistor having its base connected to its collector and further connected in series with said multiplying and dividing transistors, an output transistor having its base and emitter connected across the serial combination of all the aforesaid transistors, said output transistor operable to produce through its collector circuit a current proportional to the antilogarithm of the sum of the voltages applied between its base and emitter, a load resistor connected in the collector circuit of said output transistor, and a D.C. source connected across said resistor to provide a current flow therethrough equal in magnitude but of opposite direction to the collector cut-off current.

14. A circuit for multiplying a pair of quantities represented by current inputs comprising first and second forwardly biased and series connected input diodes each operable to produce a voltage output proportional to the logarithm of the current inputs hereto, each of said input diodes having a pair of input terminals connected across its anode and cathode, a third diode connected in series with said first and second diodes and biased forwardly with a constant current but of voltage polarity opposite to said first and second diodes, a transistor having its base and emitter connected across said first, second and third diodes, said diodes and said transistor having substantially the same temperature and current-voltage characteristics, said transistor operable to produce through its collector an output current proportional to the antilogarithm of the sum of the voltages applied between its base and emitter, and a resistor connected in the emitter circuit of said transistor for matching its current-voltage characteristic with that of said input diodes.

15. A circuit for multiplying a pair of quantities represented by current inputs comprising a first and a second forwardly poled and series connected input diode, each operable to produce a voltage output proportional to the logarithm of the current inputs thereto, each of said input diodes having a pair of input terminals connected across its anode and cathode, a third diode connected in series with said first and second diodes and biased forwardly with a constant current but of voltage polarity opposite to said first and second diodes, a transistor having its base and emitter connected across said first, second, and third diodes, said diodes and said transistor having substantially the same temperature and current-voltage characteristics, said transistor operable to produce through its collector an output current proportional to the antilogarithm of the sum of the voltages applied between its base and emitter, a load resistor connected in the collector circuit of said transistor and a D.C. source connected across said load resistor to provide a current therethrough equal in magnitude but of opposite direction to the collector cut-off current.

16. A circuit for multiplying a pair of quantities represented by current inputs comprising a first and a second forwardly poled and series connected input diode, each operable to produce a voltage output proportional to the logarithm of the current inputs thereto, each of said input diodes having a pair of input terminals connected across its anode and cathode, a third diode connected in series with said first and second diodes and biased forwardly with a constant current but of voltage polarity opposite to said first and second diodes, a transistor having its base and emitter connected across said first, second and third diodes, said diodes and said transistor having substantially the same temperature and current-voltage characteristics, said transistor operable to produce through its collector an output current proportional to the antilogarithm of the sum of the voltages applied between its base and emitter, a resistor connected in the emitter circuit of said transistor for matching its current-voltage characteristic with that of said input diodes, a load resistor connected in the collector circuit of said transistor and a D.C. source connected across said load resistor to provide a current therethrough equal in magnitude but of opposite direction to the collector cut-off current.

17. A circuit for taking the ratio of two quantities represented by current inputs comprising one multiplying input transistor and one dividing input transistor, each having its collector connected to its base, each of said input transistors having a pair of input terminals connected across its emitter-base junction, said multiplying and said dividing transistor being of opposite polarity, a compensating transistor of the same polarity as said multiplyng transistor having its collector connected to its base and connected in series with said multiplying and dividing transistors, and an output transistor having its base and emitter connected across all the aforesaid transistors, said output transistor operable to produce through its collector a current proportional to the antilogarithm of the sum of the voltages applied between its base and emitter.

References Cited by the Examiner

UNITED STATES PATENTS

| | | | |
|---|---|---|---|
| 2,244,369 | 6/41 | Martin | 235—195 X |
| 2,861,182 | 11/58 | Green | 235—197 X |
| 2,920,828 | 1/60 | Davis | 235—194 |
| 3,067,340 | 12/62 | Hodges | 307—88.5 |

OTHER REFERENCES

Waveforms, Chance et al., pages 670–674, 1949.

Multiplier for Analog Computers, Savant et al., pages 144 to 147, September 1954.

Ways to Multiply, Davis, pages 36 to 46, November 1954.

Electronic Analog Computers, Korn et al., pages 252, 253, 280, 281, 1956.

Multiplication and Division Using Silicon Diodes, Kahn, pages 235-238, February 1962.

Semiconductor Functional Blocks, Lin et al., Electronics, December 1961, pages 40–43.

MALCOLM A. MORRISON, *Primary Examiner.*

DARYL W. COOK, *Examiner.*